US008549853B2

(12) United States Patent
Neumair et al.

(10) Patent No.: US 8,549,853 B2
(45) Date of Patent: Oct. 8, 2013

(54) HYDRAULIC CONTROL DEVICE AND PRESSURE SWITCH

(75) Inventors: Georg Neumair, Thalhausen (DE); Johann Konig, Oberhaching (DE)

(73) Assignee: HAWE Hydraulik SE, Munich (DE)

( * ) Notice: Subject to any disclaimer, the term of this patent is extended or adjusted under 35 U.S.C. 154(b) by 821 days.

(21) Appl. No.: 12/748,954

(22) Filed: Mar. 29, 2010

(65) Prior Publication Data

US 2010/0263363 A1 Oct. 21, 2010

(30) Foreign Application Priority Data

Apr. 17, 2009 (EP) ..................................... 09005476
May 29, 2009 (EP) ..................................... 09007207

(51) Int. Cl.
*F16D 31/02* (2006.01)

(52) U.S. Cl.
USPC ............................................................ 60/468

(58) Field of Classification Search
USPC ..................... 60/368, 459, 433, 468; 92/132; 137/528, 115.03, 115.22; 417/300, 307, 417/440, 441, 282, 299; 116/268
See application file for complete search history.

(56) References Cited

U.S. PATENT DOCUMENTS 3,663,126 A * 5/1972 Langosch ..................... 417/300
4,388,941 A * 6/1983 Riedhammer .................. 137/82

(Continued)

FOREIGN PATENT DOCUMENTS

CN 1892050 A 1/2007
CN 101131167 A 2/2008

(Continued)

OTHER PUBLICATIONS

Office Action from the State Intellectual Property Office of the People's Republic of China dated Jan. 4, 2013 for China Patent No. 2010/10167424.9.

(Continued)

*Primary Examiner* — Edward Look
*Assistant Examiner* — Logan Kraft
(74) *Attorney, Agent, or Firm* — Cook Alex Ltd.

(57) ABSTRACT

In a hydraulic control device H comprising a pressure source P which can be switched on and switched off, a reservoir R and a pressure switch W located in a discharge path 13 from a valve assembly V to the reservoir R, which pressure switch W either connects the valve assembly V with the reservoir R or blocks the valve assembly V versus the reservoir R, the pressure switch W contains a displaceable control member 16 which is actuated in a first switching direction by a spring 17 and a pilot pressure originating from the pressure P1 acting at the valve assembly V and in a second switching direction to a control position blocking the discharge path 13 by a pilot pressure originating from the supply pressure of the pressure source, the pressure switch W is designed as a 2/2-multi-way seat valve 16 operating with a blocking position without leakage. A valve member 24 forms the control member 16 and co-operates with a valve seat 25 arranged in the discharge path 13. The pressure source P and the valve assembly V are permanently connected via a main channel 10, 11 containing a restrictor D. The discharge path 13 branches off from the main channel 10, 11, 12 between the valve assembly V and the restrictor D. The pilot pressure actuating the valve member 26 in the switching direction towards the valve seat 25 originates from the supply pressure taken between the pressure source P and the restrictor D.

19 Claims, 2 Drawing Sheets

(56) References Cited

U.S. PATENT DOCUMENTS

| | | | | | |
|---|---|---|---|---|---|
| 5,003,776 | A | * | 4/1991 | Kanai et al. | 60/434 |
| 6,033,192 | A | * | 3/2000 | Wood | 417/395 |
| 6,202,685 | B1 | | 3/2001 | Neumair | |
| 6,397,875 | B2 | * | 6/2002 | Kemmner et al. | 137/14 |
| 7,866,149 | B2 | * | 1/2011 | Brinkman et al. | 60/378 |
| 2003/0102027 | A1 | * | 6/2003 | Tougasaki et al. | 137/115.03 |

FOREIGN PATENT DOCUMENTS

| | | | | |
|---|---|---|---|---|
| DE | 3833624 | A1 | | 4/1990 |
| DE | 9410796 | U1 | * | 7/1994 |
| DE | 9410796 | U1 | | 9/1994 |
| DE | 29518025 | U1 | | 4/1997 |
| EP | 0798470 | A1 | | 10/1997 |
| EP | 0893606 | B1 | | 7/2003 |

OTHER PUBLICATIONS

European Search Report dated Sep. 21, 2012 for EP 65458A005drh, for Application No. 09007207.5-1252/2241763, with translation attached.

Chinese Office Action dated Apr. 19, 2013, for Application No. 2010/10167424.9.

* cited by examiner

HYDRAULIC CONTROL DEVICE AND PRESSURE SWITCH

RELATED APPLICATIONS

This application claims the benefit of and priority to European Patent Application No. 09005476.8, filed on 17 Apr. 2009, and European Patent Application No. 09007207.5, filed on 29 May 2009, all of which are incorporated by reference herein.

BACKGROUND OF THE INVENTION

The invention relates to a hydraulic control device according to the preamble of claim 1 and a to a pressure switch according to the preamble of claim 15.

Hydraulic control devices containing a pressure switch are known in practice in various embodiments. In one embodiment (FIG. 1—prior art) the pressure switch is located within a main flow path between the pressure source and the valve assembly. The pressure switch is a 3/2-way slider valve and connects in one control position the pressure source with the valve assembly and separates the valve assembly from the reservoir. In the other control position the connection to the pressure source is blocked and the valve assembly is connected with the reservoir. In order to achieve a smooth movability of the control member of the slider valve the control member needs a slide fit which causes unavoidable and undesirable leakage losses in flow direction to the reservoir. These leakage losses are detrimental e.g. in the case of a pump having a small displacement volume employed to build up high supply pressure in the system with a small flow rate only. In such control devices leakage losses occurring when the pressure source is driven cannot be tolerated. Among others the main reason for using the pressure switch in such hydraulic control devices is that after switching off the pressure source the pressure acting at the valve assembly has to be relieved to the reservoir, e.g. in order that the drive motor of the pump constituting the pressure source does not have to operate instantaneously against relatively high residual resistance when the drive motor is switched on. For example a one phase alternating current motor could hardly start against counter pressure. This needs to use an excessively strong and costly drive motor which is able to start properly despite residual counter pressure. In order to avoid starting problems of a drive motor just strong enough to deliver sufficient power to provide the needed torque for a small flow rate at elevated motor speed, it is furthermore known to equip the pressure source with an auxiliary volume in a pilot pressure channel. The pilot pressure channel directs the pilot pressure actuating the control member in the pressure switch in a first switching direction. The auxiliary volume is defined in a chamber within which a piston yields against spring force such that then when the drive motor starts while the pressure switch separates the valve assembly from the reservoir and connects the valve assembly with the pressure source, the pressure source is first filling the auxiliary volume with the result that the drive motor first only has to overcome small resistance. The auxiliary volume, however, means additional structural measures and allows to achieve the desired function for the motor start only if the maximum pressure in the system does not exceed e.g. about 300 bars. In case of higher maximum pressures of e.g. up to 700 bars, however, the auxiliary volume no longer functions satisfactorily.

SUMMARY OF THE INVENTION

It is an object of the invention to provide a hydraulic control device and a pressure switch of the kind as mentioned at the beginning, within which leakage losses are avoided when the pressure source operates while the discharge path to the reservoir is blocked, and which performs with minimised starting resistance for the drive motor of the pressure switch.

This object is achieved with the features of claim 1 and with the features of claim 15, respectively.

As the 2/2-way seat valve owing to its structure operates with a leakage-free blocking position, leakage losses into the reservoir will be reliably avoided when the discharge path to the reservoir is blocked while the pressure source is driven. The restrictor in the main flow connection between the pressure source and the valve assembly causes during start-up of the drive motor and while the pressure switch maintains the connection to the reservoir open that first a predetermined pressure drop has to be built up across the restrictor or a predetermined flow rate through the restrictor has to be generated, before the pressure switch switches in the blocking position and blocks the discharge path to the reservoir without leakage. This means that the discharge path to the reservoir becomes blocked after a delay but remains open during the start-up phase of the drive motor. The operating pressure source first discharges hydraulic medium without significant counter pressure into the reservoir until the drive motor has reached a sufficiently high speed without problems. Even a downsized one phase alternating current electric motor then can be used as a fair cost driving source for a pump as the pressure switch in combination with the restrictor responds "gently" in the start-up phase of the drive motor and blocks the flow path to the reservoir with a time delay. The pressure switch performs with this satisfactory behaviour even in the case of maximum system pressures of about 700 bars but always blocks the flow without leakage first when, e.g. about three quarters of the maximum pump supply flow rate is reached. The pressure drop generated across the restrictor only needs to be relatively small to assure that the pressure switch responds as desired, such that during normal operation of the hydraulic control device the pressure loss in the restrictor remains negligible. The pressure loss caused by the restrictor e.g. amounts to only about 5 to 10 bars for a maximum pressure of e.g. 500 bars.

The pressure switch is characterised by a fair cost and reliable seat valve design, a leakage-free blocking position and a gentle and timewise delayed blocking performance. The leakage-free blocking position avoids leakage losses from the pressure source to the reservoir which is very important for small aggregates containing a small discharge pump in the hydraulic control device. The "gentle" blocking performance facilitates to use a drive motor of the pressure source, which drive motor per se cannot start or does not start well against resistance. As for a proper response of the pressure switch a small pressure drop only is needed, the combination of the pressure switch and the restrictor only causes negligible loss during normal operation, i.e., when the pressure source supplies the valve assembly with a low discharge flow rate needed to build the predetermined high maximum pressure.

In an expedient embodiment the valve member has pressure receiving areas for both pilot pressures which pressure receiving areas differ from each other such that the pressure receiving area for the pilot pressure actuating the valve member in the first switching direction is smaller than the pressure receiving area for the pilot pressure actuating the valve member in the second switching direction. By matching the sizes of the pressure receiving areas in relation to each other the desirable gentle response performance of the multi-way seat valve can be achieved particularly simply. Furthermore, it is assured that a large blocking force is acting even with a small pressure drop in the multi-way seat valve such that a leakage-free blocking position is assured even up to high system pressures of about 700 bars.

The ratio between the pressure receiving areas may amount to between about 2:1 and 4:1, preferably amounts to about 3:1.

In an alternative embodiment both pressure receiving areas may be substantially equal. In order to also then achieve a sufficiently high closing force on the valve member a restrictor may be implemented which generates a somewhat higher pressure drop.

Expediently, the valve member is sealed between the smaller pressure receiving area and the valve seat by at least one ring sealing. The ring sealing also dampens the movement of the valve member advantageously and assures that no leakages occurs in the blocking position of the valve member between the relatively high pilot pressure, the relatively high supply pressure and the relatively low reservoir pressure, as such leakages could falsify the respective pilot pressure acting at the smaller pressure receiving area or at the other pressure receiving area.

Expediently, the restrictor has a fixed cross-section determining an expedient flow rate or pressure drop from the respective supply pressure. The restrictor e.g. may be a restrictor which is threaded into a main channel connecting the pressure source and the valve assembly. The threaded-in restrictor, upon demand, may be replaced by another threaded-in restrictor having another cross-section dimension. Basically, the size of the restrictor is selected depending on the normal discharge flow rate of the pressure source.

Alternatively, the restrictor may have a variable cross-section in order to tune the restrictor as expedient for the respective operation conditions or discharge flow rate.

In a structurally simple embodiment the valve member comprises a first piston defining the larger pressure receiving area and a second piston defining the smaller pressure receiving area. An annular seat surface is arranged between the first and second pistons. The seat surface, preferably, has at least substantially the same dimension as the smaller pressure receiving area. Both pistons are slidably guided and sealed in respective bores. The pistons control, depending on both pilot pressures and the force of a spring acting in opening switching direction, the movements of the valve member in the multi-way seat valve.

A concavely rounded conical transition, expediently, may be provided between the seat surface at the valve member and the first piston. The conical transition assures a proper flow guidance when the seat valve opens. A narrowed region then may be provided between the seat surface and the second piston. This narrowed region, preferably, is concavely rounded and extends around the circumference of the valve member. A flow channel defined by the narrowed region serves to properly guide the flow when the multi-way seat valve opens.

The seat surface, expediently, is conical, preferably with a cone angle of about 70°. The valve seat, as well, may be conical or even spherical, in order to assure the leakage-free blocking position when co-acting with the seat surface. In the valve member a cylindrical region may continue the seat surface in the direction towards the conical transition. Behind the cylindrical region a further conical surface may be provided. These features are advantageous for manufacturing the valve member (grinding) and additionally functions as an advantageous stroke assistance during the opening stroke of the valve member.

In an expedient embodiment the valve member is arranged within a stepped bore containing the valve seat. The stepped bore has, preferably, two stepped bore sections where lateral channels lead to the stepped bore.

In an expedient embodiment the stepped bore is contained in a sleeve which has several outer and axially distant sealing regions and which can be inserted simply into a simple interior bore of e.g. a housing.

In a further expedient embodiment the sleeve is arranged in the housing in sealed fashion in an interior bore. The interior bore is formed with two annular channels. These channels lead to one of the ring channels which channels are connected with a pressure source port and a valve assembly port of the housing. The other ring channel is connected via a channel with a reservoir port of the housing. With a view to, e.g. simple assembly a continuous sleeve fixation screw may be fixed in the interior bore. A free end of the interior bore may be closed by a closing screw facilitating a comfortable assembly of the components of the multi-way seat valve in the housing. The closing screw may form a boundary of a control chamber for the pilot pressure which is transmitted from a location between the pressure source and the restrictor. The pilot pressure actuates in the control chamber the larger pressure receiving area of the valve member through the sleeve fixation screw which has a through hole. The valve member piston defining the larger pressure receiving area, may be guided with a slide fit in the stepped bore, even without a further sealing or gasket, as high pilot pressure in the control chamber is acting in the blocked position of the multi-way seat valve close to a region where the also high supply pressure is present. Alternatively, there may even be an annular sealing between the piston defining the larger pressure receiving area and the wall of the stepped bore.

The spring which keeps the valve member in the opening position when the hydraulic control device is in a pressure-free condition, expediently may be arranged at the second piston defining the smaller pressure receiving area. The spring may rest at the bottom of the interior bore. As the second piston is guided in the stepped bore the spring will be positioned properly while the valve member moves.

Expediently, the restrictor, the spring and the pressure receiving areas of the valve member are adapted in relation to each other such that when switching on the pressure source first a predetermined pressure drop across the restrictor or a predetermined flow rate through the restrictor is generated before still open the discharge path to the reservoir is blocked in leakage-free fashion. The build up of the pressure drop or the discharge flow rate occurs with a delay facilitating the start-up of a drive motor of the pressure source, preferably of a one phase alternating current electric motor. Due to this performance of the pressure switch and the restrictor a "gentle" response performance of the pressure switch is achieved without the necessity to provide further structural measures in the hydraulic control device for a similar function. When the drive motor of the pressure source is switched off, both residual pressure from the valve assembly and the pressure acting in the main channel from the side of the pressure source are relieved into the reservoir. Optionally, the pressure at the valve assembly may be held by use of a check valve blocking in flow direction to the reservoir in a part of the main channel, meaning that only the part of the main flow path will be pressure relieved which extends from this check valve to the pressure switch.

In small aggregates containing a small discharge flow rate pressure source used for generating high system pressure, the restrictor only causes a negligible counter pressure or a low pressure drop when the drive motor starts. First when about three quarters of the maximum pump discharge flow rate is reached the pressure drop will be large enough (about 5 to 10 bars) such that only then the multi-way seat valve constituting the pressure switch will switch into the blocking position. Then the pressure source supplies hydraulic medium through the restrictor to the valve assembly. Then the restrictor only causes a negligible pressure loss of a few percent which can easily be tolerated.

BRIEF DESCRIPTION OF THE DRAWINGS

Embodiments of the invention will be explained with the help of the drawings. In the drawings is.

DETAILED DESCRIPTION OF THE INVENTION

Figure 1:
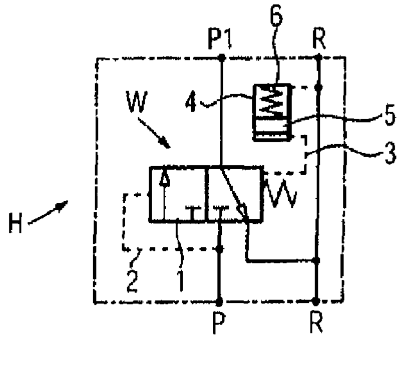
FIG. 1 (prior art)
FIG. 1 a block diagram of a hydraulic control device according to prior art, FIG. 2 a block diagram of a hydraulic control device according to the invention, FIGS. 3 and 4 two related vertical sections of a detailed embodiment of a pressure switch for the hydraulic control device of FIG. 2, FIG. 5 a side of a valve member of the pressure switch, and FIG. 6 an axial sectional view of a sleeve of the pressure switch of FIGS. 3 and 4.

A hydraulic control device H (FIG. 1—prior art) comprises a 3/2 -multi-way slider valve 1 located between a pressure source P and a not shown valve assembly (pressure P1 acting at the valve assembly). The control member of the 3/2-multi-way slider valve 1 connects in pressure-free condition (first control position of the valve member, as shown) of the hydraulic control device H a line containing pressure P1 with a reservoir R, while a line to which the pressure source P is connected is blocked. This control position of the control member is assisted by a spring. The control member of the 3/2-multi-way slider valve 1 is actuated by a pilot pressure in a direction to a second control position. The pilot pressure originates from the pressure source P and acts in a pilot line 2. The control member is actuated parallel to the spring in the direction to the first control position by pilot pressure originating from the pressure P1 in a pilot line 3. The control member is formed as a slider operating with a slide-fit, needed for smooth movability of the control member. The slide-fit, however, unavoidably causes leakage to the reservoir R as soon as pressure is present, in particular permanent leakage in each control position in the second control position of the valve member where the discharge path should be isolated from the pressure side. The pressure source P e.g. is a pump which is driven by a not shown electric motor which is switched on and switched off upon demand. At least one hydraulic consumer is controlled by pressure P1 via the not shown valve assembly.

In the shown first control position pressure P1 is relieved to the reservoir R. The connection from the pressure source P to pressure P1 is blocked. When the drive motor starts it has to overcome the pressure resistance caused by the spring until pilot pressure is built up in pilot line 2. The 3/2-multi-ways slider valve instantaneously switches to the second control position such that immediately significant counter pressure at the pressure source P (pressure P1) has to be overcome. The drive motor has to overcome this counter pressure which e.g. in case of a one phase alternating current electric motor as the drive motor would cause the problem that the electric motor does not start. In order to relieve the drive motor during start-up an auxiliary volume 4 is functionally associated to the pressure switch W. In a chamber in the pilot line 3 a piston 5 can be displaced counter to the force of a spring 6. As soon as the 3/2-multi-ways slider valve 1 has switched into the second control position, the auxiliary volume 4 is filled via the pilot line 3. The piston 5 becomes displaced counter to the force of the spring 6. The drive motor starts more easily as no significant counter pressure has to be overcome until the speed of the drive motor is high enough. A purpose of the pressure switch W is furthermore to relieve the pressure P1 from the valve assembly into the reservoir R while the drive motor is switched off.

Figure 2:
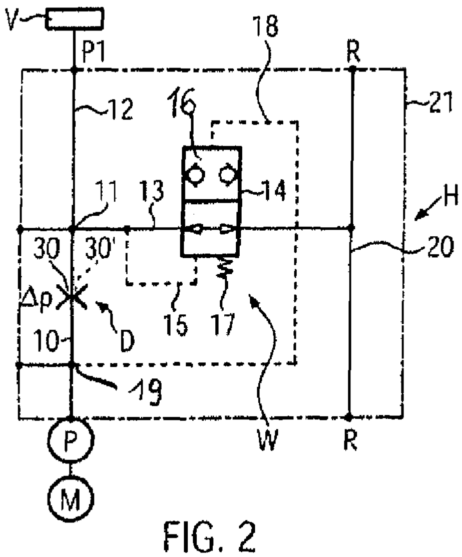

FIG. 2 shows a hydraulic control device H with a pressure switch W according to the invention. The pressure switch W operates without additional structural measures with a "gentle" response performance in order to facilitate that the drive motor M of the pressure source P is allowed to without counter pressure, independent from the respective maximum system pressure P1 which e.g. may amount to about 700 bars, and first builds up the desired supply pressure P1 at the valve assembly V when the drive motor M has reached a certain speed and is powerful enough drive the pump against counter pressure and to build up the maximum supply pressure, e.g. after the supply flow rate of the pressure source P reaches about three quarters of the respective maximum supply flow rate.

In a housing 21 of the pressure switch W a main channel 10, 12 extends between the pressure source P and the valve assembly V. A discharge path 13 to a reservoir line 20 of the reservoir R branches off at a node 11 of the main channel 10, 12. A 2/2-multi-way seat valve 14 constituting the pressure switch W is arranged in the discharge path 13. The 2/2-multi-way seat valve 14 switches depending on the current pressure between a first control position (through flow position) as shown in FIG. 2 and a second control position (blocking position, without leakage, not shown). The 2/2-multi-way seat valve 14 contains a control member 16. The second control position (blocking position without leakage) in this case is held without leakage in any of both flow directions.

The control member 16 of the 2/2-multi-way seat valve 14 is actuated in a direction to the first control position by a spring 17 and parallel to the spring by a pilot pressure in a pilot line 15. The pilot line 15 branches off from the discharge path 13. The control member 16, as well, is actuated in a direction to the second control position by pilot pressure in a pilot line 18 branching off at a node 19 from a section 10 of the main channel 10, 12. The node 19 is located between the pressure source P and a restrictor D. The restrictor D is arranged between the nodes 19 and 11. The purpose of the restrictor D is to generate a predetermined pressure drop Δp from the supply flow rate of the pressure source P. While the pressure source P discharges hydraulic medium into the reservoir line 20 (FIG. 1), and sufficient pilot pressure will be built up in the pilot line 19 caused by the pressure drop Δp across the restrictor D to actuate the 2/2-multi-way seat valve 14 counter to the pilot pressure in pilot line 15 and the force of the spring 17 into the second control position (blocking position without leakage). First then supply pressure P1 is built up with maximum magnitude at the valve assembly V e.g. with the maximum supply flow rate. This facilitates starting of the drive motor M from standstill, because counter pressure in the main channel 10, 12 will be built up after a predetermined time delay has expired, i.e., after by virtue of the restrictor D a predetermined pressure drop Δp (e.g. about 5 to 10 bars) or a predetermined flow rate is achieved across the restrictor D.

The restrictor D may have a fixed cross-section 30, or may have, as indicated in dotted lines at 30', a variable cross-section. In any case, the cross-section 30, 30' of the restrictor D is e.g. selected depending on the maximum supply flow rate of the pressure source P.

Figure 3:
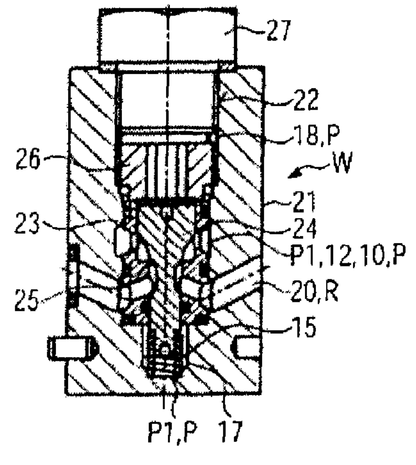

FIGS. 3 to 6 illustrate a detailed embodiment of the pressure switch W according to the invention which e.g. is arranged in a block-shaped housing 21 indicated in FIG. 2. The housing 21 has an interior e.g. stepped blind bore 22. A sleeve 23 is fixed in the interior blind bore 22 in sealed fashion. A valve member 24 is slidably guided in the sleeve 23 in sealed fashion. The valve member 24 co-operates with a valve seat 25 formed in the sleeve 23. The sleeve 23 e.g. is positioned in a stepped bore defining the interior bore 22 by a sleeve fixation screw 26 which has a through hole. The free end of the interior blind bore 22 is closed by a sealing closing screw 27 which bounds a control chamber into which the pilot line 18 leads from the node 19. To the contrary, the pilot line 15 leads to the lower blind end of the interior bore 22. The spring 17 is arranged in this region. The interior bore 22 has e.g. two ring channels. The upper ring channel in FIG. 3 is connected with the sections 10, 12 of the main channel, while the lower ring channel is connected with the reservoir line 20. In alignment with the ring channels in the housing 20 the sleeve 23 (FIG. 6) has corresponding lateral passages.

Figure 4:
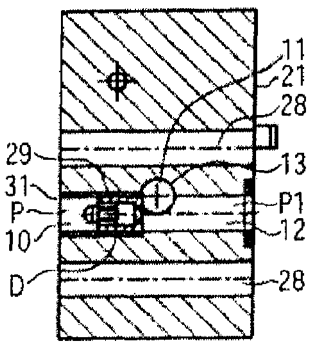
Figure 5:
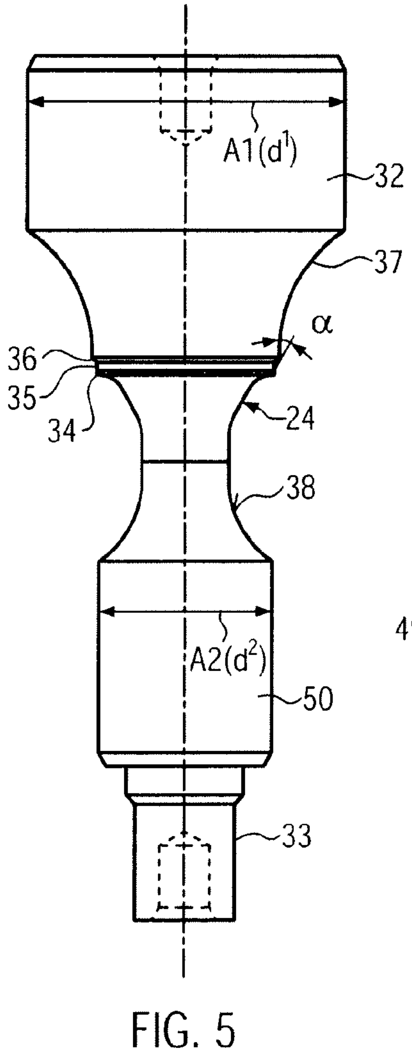

FIG. 4 is a sectional view of the housing 21 in a sectional plane parallelly offset to the sectional plane of FIG. 3. Two passages 28 serve to accommodate screws fixing the housing 21 e.g. at the pressure source P and/or at the valve assembly V. In a bore 31 which partially is formed with a thread and which defines parts of the main channel 10, 12 the restrictor D is screwed-in, e.g. adjacent to the node 11 where the discharge path 13 branches off. The restrictor D in this case is a restrictor screw 29 having a fixed restrictor cross-section 30 (e.g. with a diameter of 0.8 mm). The restrictor screw 29 is fixed in the bore 31. The valve member 24 comprises a first piston 32 defining a larger pressure receiving area A1 (diameter d1), and an axially distant second piston 50 defining a smaller pressure receiving area A2 (diameter d2). A seat surface 34 is formed between the pistons 32, 50, e.g. a seat surface 34 of conical form with a cone angle a of about 70°. A circular cylindrical projection 35 continues the seat surface 34 in a direction to the first piston 32. A further short conical circumferential surface 36 follows the circular cylindrical projection 35. The conical surface 36 is continued by a concavely rounded conical transition 37 which extends with increasing diameter to the first piston 32. A narrowed region 38 is provided between the seat surface 34 and the second piston. The narrowed region 38, preferably, is rounded concavely. A boss 33 is formed at the lower end of the second piston 50. The boss 33 serves to position and suspend the spring 17 (FIG. 3).

Figure 6:
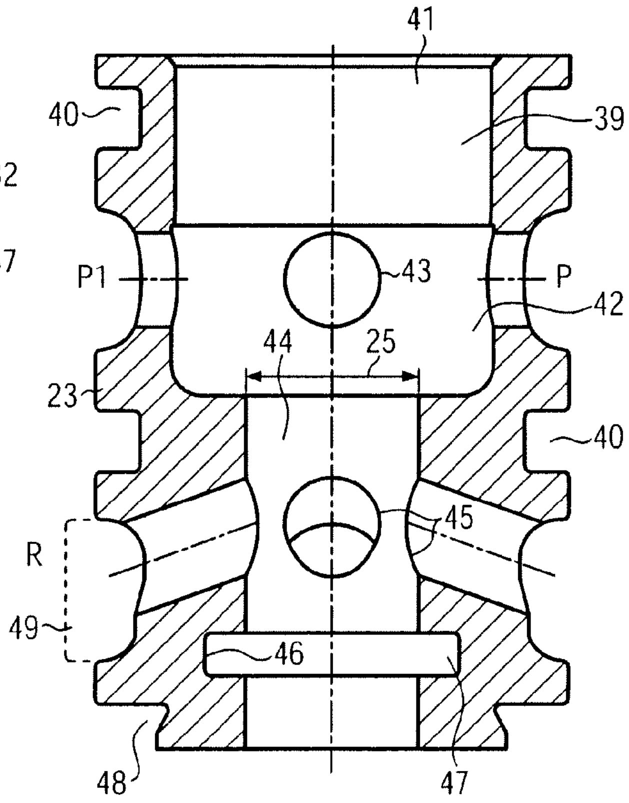

The valve member 24 is slidably mounted in the sleeve 23 (see FIG. 3 which is also shown in FIG. 6). The sleeve 23 has at the outer side several sealing grooves 40 and, optionally also an undercut 48 at the lower end, respectively for positioning a ring seal or gasket (not shown), in order to seal between the various pressure regions of the sleeve 23 in the interior bore 22 in the housing 21 (FIG. 3). A stepped bore 39 is formed in the sleeve 23. The stepped bore 39 has an upper stepped bore section 41 for the first piston 32, an intermediate section 42 extending to the valve seat 25, and a stepped bore section 44 of smaller diameter for guiding the second piston 50. An annular groove 46 for at least one ring seal 47 is formed in the stepped bore section 44. The ring seal 47 seals the second piston 50 at its outer circumference and assures pressure tightness between lateral ports 45 leading into the stepped bore section 44 and to the lower end of the sleeve 23. Sideward ports 43 leads into the intermediate section 42.

The sideward ports 43 and 45 lead respectively into a ring channel in the housing 21 (FIG. 3. In FIG. 6 one ring channel 49 connected with the sideward ports 45 is indicated in dotted lines.

Referring to FIGS. 3, 4, 5 and 6 (blocking position in FIG. 3) the sideward ports 43 are connected with the pressure source P and contain the pressure P1 acting at the valve assembly V, while in the ring chamber 49 and the sideward ports 45 a connection is open to the reservoir R. Both pressures P and P1 are acting in the blocking position in the stepped bore section 41 or the intermediate section 42 and the narrowed region 37. The larger pressure receiving area A1 is actuable from the pilot line 18 by pilot pressure, while the second piston 50 is actuable on the smaller pressure receiving area A2 by pilot pressure from the pilot line 15. The spring 17 is acting via the boss 32 at the second piston in opening direction of the valve member 24.

In the above-explained blocking position of the pressure switch W the pressure source P supplies hydraulic medium to the valve assembly V, while the discharge path 13 is blocked without leakage. The drive motor M drives the pressure source P. The hydraulic control device H is in operation, e.g. to control movements of a not shown cylindrical consumer.

When the drive motor M is switched off, the predetermined pressure drop Δp across the restrictor 30 vanishes and the pilot pressures in pilot lines 15 and 18 become equal to each other. Finally, the spring force of the spring 17 lifts the valve member seat surface 34 from the valve seat 25. The discharge path 13 to the reservoir line 20 is opened such that the residual pressure of pressures P1, P is completely relieved, optionally to a very low reservoir pressure. The hydraulic control device does not operate.

When the drive motor M again is switched on the pressure source P builds up a pressure drop across the restrictor D while the connection to the discharge path 13 at first remains open in the pressure switch W. As soon as the pressure drop reaches a predetermined magnitude Δp (corresponding to a predetermined discharge flow rate) the pilot pressure in the pilot line 18 pushes the valve member 24 with the seat surface 34 against a valve seat 25 (blocking position without leakage). This occurs first after the predetermined pressure drop has been built up with time a delay which assists the start-up phase of the drive motor M, because the drive motor M only has to overcome via the pressure source P the small counter pressure caused by the restrictor D while the mechanical section 10 is still connected with the discharge line 13. As the discharge path 13 first is blocked then, the drive motor M has already reached a speed at which the drive motor M is powerful enough to drive the pressure source P and to build up the desired maximum supply pressure P1. During normal operation the pressure source P supplies the valve assembly V with hydraulic medium through the restrictor D.

Provided that the pressure receiving area A2 or the diameter d2 at least substantially corresponds to the cross-section of the valve seat 25 (diameter d3), the generated closing force on the valve member 24 depends on the pressure drop across the restrictor 30. In a case in which the diameter d2 is selected smaller than the cross-section of the valve seat (diameter d3) the closing force could even be chosen arbitrarily depending e.g. on the pressure P1. In this case the force of the spring 17 (needed for opening the seat valve) could be selected stronger.

Alternatively the pressure receiving areas A1, A2 (diameters d1 and d2) could be substantially equal and/or could be larger than the cross-section (diameter d3) of the valve seat 25 of the pressure receiving area A1 (diameter d2). The relative dimensions are selected e.g. depending on the application condition and/or the start-up behaviour of the drive motor M. Such selected relative dimensions are included into the invention.

The invention claimed is:

1. Hydraulic control device comprising a pressure source which can be switched on and switched off for supplying at least one consumer via at least one valve assembly with pressurised hydraulic medium, a reservoir, and a pressure switch arranged in a discharge path extending at least from the valve assembly to the reservoir , the pressure switch connecting the valve assembly via the discharge path with the reservoir when the pressure source is switched off, the pressure switch blocking the discharge path to the reservoir when the pressure source is switched on and builds up supply pressure, the pressure switch containing a movable control member which is actuable by a spring and a first pilot pressure originating from the pressure acting at the valve assembly in a first switching direction to a control position for opening the discharge path to the reservoir and by a second pilot pressure originating from the supply pressure in a second switching direction to a control position for blocking the discharge path, wherein the pressure switch is a 2/2-multi-way seat valve operating with a blocking position without leakage and containing a valve member forming the control member and a valve seat arranged in the discharge path, that the pressure source is permanently connected with the valve assembly via a restrictor contained in a main channel supplied with supply pressure from the pressure source, that the discharge path branches off from the main channel to the reservoir between the restrictor and the valve assembly, and that the second pilot pressure actuating the valve member in the second switching direction toward the valve seat originates from the supply pressure acting upstream of the restrictor in the main channel between the pressure source and the restrictor, and wherein the valve member is arranged in a stepped bore containing the valve seat, and having two stepped bore sections, that sideward channels of a sleeve extend to the stepped bore sections, the sleeve having outer axially distant annular sealing regions.

2. Hydraulic control device according to claim 1, wherein the valve member is formed with pressure receiving areas of different sizes for both the first and second pilot pressures, such that the pressure receiving area for the first pilot pressure actuating the valve member in the first switching direction is smaller than the pressure receiving area for the second pilot pressure actuating the valve member in the second switching direction, wherein, preferably, the ratio between the pressure receiving areas amounts to about 2:1 and 4:1.

3. Hydraulic control device according to claim 2, wherein the valve member is sealed between the smaller pressure receiving area and the valve seat by at least one ring sealing.

4. Hydraulic control device according to claim 2, wherein the valve member comprises a first piston defining the larger pressure receiving area and a second piston defining the smaller pressure receiving area, and that an annular seat surface is provided between the first and second piston, the seat surface at least having about the size of the smaller pressure receiving area.

5. Hydraulic control device according to claim 4, wherein a concavely rounded conical transition is provided between the seat surface and the first piston, and that a narrowed region is provided between the seat surface and the second piston.

6. Hydraulic control device according to claim 5, wherein the seat surface has a conical form, preferably with a cone angle ($\alpha$) of about 70° , and that a cylindrical projection and a further conical surface continue the seat surface in a direction to the conical transition.

7. Hydraulic control device according to claim 4, wherein the sleeve is seated in an interior bore of a housing, the interior bore being formed with two ring channels, that channels leading to a pressure source port and a valve assembly port are connected to one ring channel and that a channel leading to a reservoir port is connected to the respective other ring channel, that a sleeve fixation screw having a through hole is fixed in the interior bore, and that a free end of the interior bore is closed by a closure screw bounding a control chamber for the first piston defining the larger pressure receiving area, the control chamber being actuated with the second pilot pressure taken between the pressure source and the restrictor.

8. Hydraulic control device according to claim 4 wherein the seat surface is somewhat larger than the smaller pressure receiving area.

9. Hydraulic control device according to claim 1, wherein the valve member is formed with at least substantially equally dimensioned pressure receiving areas for both the first and second pilot pressures.

10. Hydraulic control device according to claim 1, wherein the restrictor has a fixed cross-section.

11. Hydraulic control device according to claim 10 wherein the restrictor is repiaceably arranged in a main channel connecting the pressure source and the valve assembly.

12. Hydraulic control device according to claim 1, wherein the restrictor has a variable cross-section.

13. Hydraulic control device according to claim 1, wherein the restrictor is a restrictor screw which is fixed with a threaded connection in the channel in the housing which channel is connected with the pressure source port.

14. Hydraulic control device according to claim 4, wherein the spring is arranged at the second piston which is actuated by the first pilot pressure originating from the pressure acting at the valve assembly.

15. Hydraulic control device according to claim 1, wherein the restrictor, the spring and the pressure receiving areas at the valve member are adapted such in relation to each other that after switching on the pressure source first the predetermined pressure drop ($\Delta p$) across the restrictor or a predetermined volume flow rate through the restrictor is generated, before the discharge path to the reservoir is blocked without leakage, the build up of the predetermined pressure drop or the predetermined volume flow rate resulting in a delay until counter pressure builds up which delay facilitates the start-up of a drive motor of the pressure source.

16. Hydraulic control device according to claim 15 wherein the drive motor of the pressure source is a one phase alternating current electric motor.

17. Hydraulic control device according to claim 1, wherein the valve member is formed with pressure receiving areas of different sizes for both the first and second pilot pressures, such that the pressure receiving area for the first pilot pressure actuating the valve member in the first switching direction is smaller than the pressure receiving area for the second pilot pressure actuating the valve member in the second switching direction, wherein, preferably, the ratio between the pressure receiving areas amounts to about 3:1.

18. Pressure switch for a hydraulic control device, the pressure switch connecting a valve assembly via a discharge path with a reservoir when a pressure source is switched off, the pressure switch blocking the discharge path to the reservoir, when the pressure source is switched on and has built up supply pressure for the valve assembly, the pressure switch containing a movable control member actuable in a first switching direction to a control position opening the discharge path by a spring and a first pilot pressure originating from a pressure acting at the valve assembly and in a second switching direction to a control position blocking the discharge path by a second pilot pressure originating from the supply pressure of the pressure source, wherein the pressure switch is a 2/2-multi-way seat valve containing a valve member forming the control member and a valve seat arranged in the discharge path, that the 2/2-multi-way seat valve is switchable to a blocking position without leakage, that the pressure source and the valve assembly are interconnected permanently via a restrictor, that the discharge path branches off from a main channel interconnecting the pressure source and the valve assembly between the valve assembly and the restrictor, and that the second pilot pressure actuating the valve member in the second switching direction to the valve seat originates from the supply pressure between the pressure source and the restrictor, and wherein the valve member is arranged in a stepped bore containing the valve seat, and having two stepped bore sections, that sideward channels of a sleeve extend to the stepped bore sections, the sleeve having outer axially distant annular sealing regions.

19. Hydraulic control device comprising a pressure source which can be switched on and switched off for supplying at least one consumer via at least one valve assembly with pressurised hydraulic medium, a reservoir, and a pressure switch arranged in a discharge path extending at least from the valve assembly to the reservoir , the pressure switch connecting the valve assembly via the discharge path with the reservoir when the pressure source is switched off, the pressure switch blocking the discharge path to the reservoir when the pressure source is switched on and builds up supply pressure, the pressure switch containing a movable control member which is actuable by a spring and a first pilot pressure originating from the pressure acting at the valve assembly in a first switching direction to a control position for opening the discharge path to the reservoir and by a second pilot pressure originating from the supply pressure in a second switching direction to a control position for blocking the discharge path, wherein the pressure switch is a 2/2-multi-way seat valve operating with a blocking position without leakage and containing a valve member forming the control member and a valve seat arranged in the discharge path, that the pressure source is permanently connected with the valve assembly via a restrictor contained in a main channel supplied with supply pressure from the pressure source, that the discharge path branches off from the main channel to the reservoir between the restrictor and the valve assembly, and that the second pilot pressure actuating the valve member in the second switching direction toward the valve seat originates from the supply pressure acting upstream of the restrictor in the main channel between the pressure source and the restrictor and wherein the valve member is formed with pressure receiving areas of different sizes for both the first and second pilot pressures, such that the pressure receiving area for the first pilot pressure actuating the valve member in the first switching direction is smaller than the pressure receiving area for the second pilot pressure actuating the valve member in the second switching direction, wherein, preferably, the ratio between the pressure receiving areas amounts to about 2:1 and 4:1, and wherein the valve member comprises a first piston defining the larger pressure receiving area and a second piston defining the smaller pressure receiving area, and that an annular seat surface is provided between the first and second piston, the seat surface, preferably, at least having about the size of the smaller pressure receiving area and wherein a concavely rounded conical transition is provided between the seat surface and the first piston, and that a narrowed region is provided between the seat surface and the second piston.

* * * * *